US009201947B2

(12) United States Patent
Wu et al.

(10) Patent No.: US 9,201,947 B2
(45) Date of Patent: Dec. 1, 2015

(54) METHODS AND SYSTEMS FOR MEDIA FILE MANAGEMENT

(71) Applicant: HTC Corporation, Taoyuan, Taoyuan County (TW)

(72) Inventors: Chia-Fu Wu, Taoyuan (TW); Jenn-Wein Wu, Taoyuan (TW); Wen-Chien Liu, Taoyuan (TW); Jing-Lung Wu, Taoyuan (TW); Hsin-Ti Chueh, Taoyuan (TW); Ping-Yao Liao, Taoyuan (TW); David Folchi, Taoyuan (TW); Casaundra Meyers, Taoyuan (TW); Symon J. Whitehorn, Taoyuan (TW); Dennis Todd Harrington, Taoyuan (TW); Jorge Taketoshi Furuya Mariche, Taoyuan (TW); John Paul Stallard, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 203 days.

(21) Appl. No.: 13/846,175

(22) Filed: Mar. 18, 2013

(65) Prior Publication Data
US 2014/0081975 A1 Mar. 20, 2014

Related U.S. Application Data

(60) Provisional application No. 61/703,625, filed on Sep. 20, 2012, provisional application No. 61/752,601, filed on Jan. 15, 2013.

(51) Int. Cl.
G06F 17/30 (2006.01)
G11B 27/031 (2006.01)
G11B 27/28 (2006.01)
G11B 27/32 (2006.01)

(52) U.S. Cl.
CPC .... *G06F 17/30598* (2013.01); *G06F 17/30058* (2013.01); *G06F 17/30126* (2013.01); *G11B 27/031* (2013.01); *G11B 27/28* (2013.01); *G11B 27/322* (2013.01)

(58) Field of Classification Search
USPC .......................... 707/736; 386/239; 715/234
See application file for complete search history.

(56) References Cited

U.S. PATENT DOCUMENTS

| | | | |
|---|---|---|---|
| 2004/0095396 A1* | 5/2004 | Stavely et al. | 345/838 |
| 2005/0204287 A1* | 9/2005 | Wang | 715/716 |
| 2006/0251382 A1 | 11/2006 | Vronay et al. | |
| 2007/0065044 A1* | 3/2007 | Park et al. | 382/305 |
| 2008/0084400 A1* | 4/2008 | Rosenberg | 345/173 |
| 2008/0304808 A1 | 12/2008 | Newell et al. | |
| 2009/0313324 A1* | 12/2009 | Brooks et al. | 709/203 |
| 2009/0319472 A1* | 12/2009 | Jain et al. | 707/2 |
| 2011/0249953 A1* | 10/2011 | Suri et al. | 386/239 |
| 2012/0114310 A1 | 5/2012 | Hymel et al. | |
| 2012/0260158 A1* | 10/2012 | Steelberg | 715/234 |
| 2013/0086078 A1* | 4/2013 | Malleshaiah | 707/748 |

FOREIGN PATENT DOCUMENTS

| | | |
|---|---|---|
| TW | 200818907 A | 4/2008 |
| WO | WO 03/101097 A1 | 12/2003 |

* cited by examiner

*Primary Examiner* — Hung T Vy
(74) *Attorney, Agent, or Firm* — Birch, Stewart, Kolasch & Birch, LLP

(57) ABSTRACT

Methods and systems for media file management are provided. When a plurality of media files in the electronic device are viewed, media data is real-time generated for the media files. In the generation of the media data, the media files are analyzed to obtain a theme for the media files. Then, a script file is identified according to the theme, and media data is produced for the media files according to the script file. In some embodiments, a frame buffer used for storing the media data is refreshed after each frame of the media data is rendered.

43 Claims, 11 Drawing Sheets

METHODS AND SYSTEMS FOR MEDIA FILE MANAGEMENT

CROSS REFERENCE TO RELATED APPLICATIONS

This application claims priority of U.S. Provision Application No. 61/703,625, filed on Sep. 20, 2012, and U.S. Provision Application No. 61/752,601, filed on Jan. 15, 2013, the entireties of which are incorporated by reference herein.

BACKGROUND OF THE INVENTION

1. Field of the Invention

The disclosure relates generally to methods and systems for media file management, and, more particularly to methods and systems for generating and/or presenting media data for a group of media files.

2. Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

Currently, a handheld device may provide image capturing (picture-taking) capabilities operating like a digital camera, and picture takers can use the image capturing (picture-taking) capabilities of the device to take images and/or videos. Due to the convenient function, taking pictures with handheld device has become a very common behavior.

Generally, the files of images and/or videos are classified into folders which are managed by a file management system of the device. Conventionally, users can distinguish between the folders according to the folder names. In some cases, it is difficult to locate a specific folder when a large amount of folders are in the device. Currently, a thumbnail corresponding to one or few images in a folder can be shown on the icon corresponding to the folder, thereby helping users to distinguish between the folders. However, the thumbnail corresponding to one or few images cannot show the complete picture of the folder. It is still hard to locate a specific folder when a large amount of folders are in the device.

BRIEF SUMMARY OF THE INVENTION

Methods and systems for media file management are provided.

In an embodiment of a method for media file management, when a plurality of media files in the electronic device are viewed, media data is real-time generated for the media files. In the generation of the media data, the media files are analyzed to obtain a theme for the media files. Then, a script file is identified according to the theme, and media data is produced for the media files according to the script file.

An embodiment of a system for media data management comprises a storage unit and a processing unit. The storage unit comprises a plurality of media files. When a plurality of media files in the electronic device are viewed, the processing unit real-time generating media data for the media files. In the generation of the media data, the media files are analyzed to obtain a theme for the media files. A script file is identified according to the theme, and media data is produced for the media files according to the script file.

In some embodiments, the step of analyzing the media files is performed by detecting faces in the respective images or the respective image frames of the videos, checking position information corresponding to the respective images or the respective image frames of the videos, checking exposure time of the respective images or the respective image frames of the videos, and/or checking taken time or data, or sharpness of the respective media files.

In some embodiments, specific media files are selected from the media files based on contents of the respective media files, comments corresponding to the respective media files from at least one social network, position information corresponding to the respective media files, related data recorded when the respective media files are captured, and/or historical behaviors corresponding to the respective media files. In some embodiments, the historical behaviors comprise a view frequency, a share frequency, and/or a zoom frequency.

In some embodiments, the media files are trimmed to obtain the trimmed media files comprising periods that faces show up, at least one object is moving, or people is speaking. In some embodiments, the respective media file is trimmed based on the script file, such that the trimmed video is aligned with characteristics defined in the script file.

In some embodiments, a background audio of the respective media file is mixed with the specific music, wherein when a human speech is in a specific period of the media file, the volume of the specific music within the corresponding specific period is lowered and mixed with the background audio of the media file.

In some embodiments, effect or transition is further generated between the media files according to the script file. In some embodiments, the content for the effect and/or transition is real-time generated when the media data is played.

In some embodiments, the media files comprise images, videos, music, and/or texts.

In some embodiments, an engine can simultaneously provides at least one video of n seconds and m images in n seconds, such that the video and the images are analyzed.

In some embodiments, a representative of the media data is displayed. In some embodiments, the media data is played when the representative is triggered, wherein the representative is triggered by pressing a play button shown on the representative. In some embodiments, the media data is automatically played when the representative is been viewed.

In some embodiments, the media data is generated after entering a folder containing the media files. In some embodiments, the media data is automatically played once after entering the folder. In some embodiments, the media data is played based on data detected by a sensor of the electronic device.

In some embodiments, the media data is played in a full screen display if a contact corresponding to the media data on a touch-sensitive device is detected when the media data is played. In some embodiments, the media data is stopped playing if a movement between the media files on a touch-sensitive device is detected.

In some embodiments, a frame buffer used for storing the media data is refreshed after each frame of the media data is rendered Methods for media file management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for media file management are provided.

Figure 1:
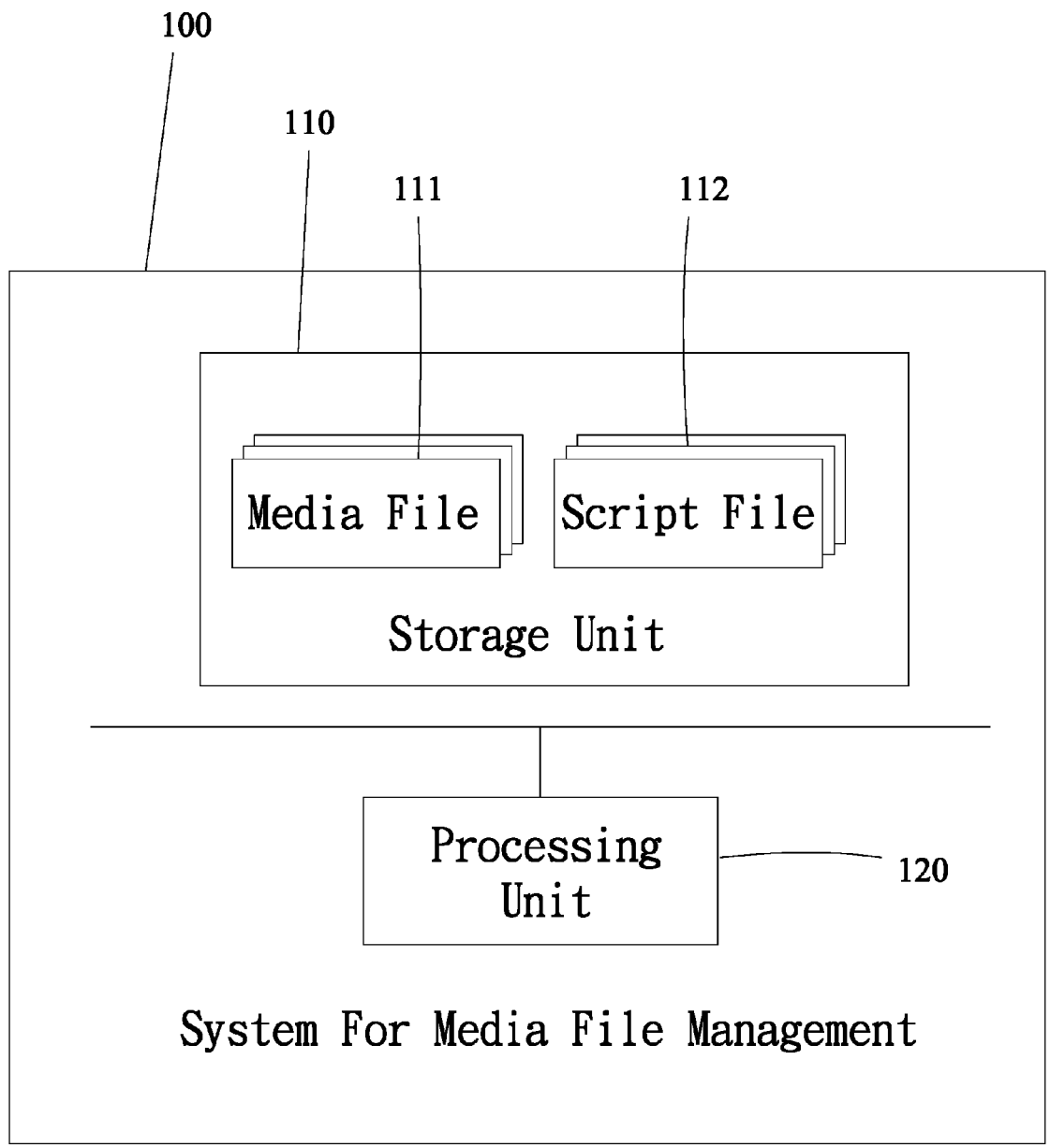
FIG. 1 is a schematic diagram illustrating an embodiment of a system for media file management of the invention.

FIG. 1 is a schematic diagram illustrating an embodiment of a system for media file management of the invention. The system for media file management 100 can be used in an electronic device, such as a computer, or a portable device, such as a digital camera, a handheld device such as a mobile phone, a smart phone, a PDA (Personal Digital Assistant), a GPS (Global Positioning System), or any picture-taking device.

The system for media file management 100 comprises a storage unit 110 and a processing unit 120. The storage unit 110 comprises a plurality of media files 111, such as images, videos, music, and/or texts. In some embodiments, the texts may be from comments corresponding to the respective media file, such as image or video from at least one social network. It is understood that, in some embodiments, the system for media file management 100 can also comprise an image capture unit (not shown in FIG. 1). The image capture unit may be a CCD (Charge Coupled Device) or a CMOS (Complementary Metal-Oxide Semiconductor), placed at the imaging position for objects inside the electronic device. The image capture unit can capture the media files. It is also understood that, in some embodiments, the system for media file management 100 can also comprise an engine (not shown in FIG. 1), which can simultaneously provide at least one video of n seconds and m images in n seconds. In an example, n=4 and m=20. It is noted that, the engine may be inside or outside the electronic device. It is also understood that, in some embodiments, the system for media file management 100 can also comprise a display unit (not shown in FIG. 1). The display unit can display related figures and interfaces, and related data, such as the media files 111. It is understood that, in some embodiments, the display unit may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit. Additionally, the storage unit 110 can also comprise a plurality of script files 112. The respective script file defines at least one characteristic, such that media data can be generated according to the script file. In some embodiments, the characteristics can be defined according to the tempos, melody, beats, cord, and/or chorus of a specific music. It is noted that, the respective script file 112 can correspond to a theme, which can be a specific type or classification for the media files 111. The processing unit 120 can control related components of the system for media file management 100, process the media files, and perform the methods for media file management, which will be discussed further in the following paragraphs.

It is understood that, in some embodiments, the script file may comprise some metadata for producing instruction. The format of metadata for example may be {"timestamp": 1.000000, "effect":[0,0], "transition":[0], "source":[0,0]}, wherein "timestamp" is the timing of playing media files composing the media data, "effect" and "transition" are the effects and transitions generated between the media files, and/or applied to the media files, and "source" specifies which media file or proprietary format, like at least one video of n seconds and m images in n seconds. It is noted that, "effect" comprises two data fields, one is to indicate type of effect and the indicate sub-type of effect. "Transition" indicates type of transition. "source" comprises two data fields. One is to indicate type of source and the other one is to indicate essentiality of a need to trim the source. In one example, when the theme is identified as family, a music composed of melody making people happy and warm and a music script are identified for producing. Some clips of music correspond to some metadata of the music. For example, there may be there clips of music worth to company with videos/images. The music script comprise there metadata such as {"timestamp":1.000000, "effect":[1,0], "transition":[0], "source":[0,0]}, {"timestamp":3.000000, "effect":[2,0], "transition":[0], "source":[0,0]}, and {"timestamp": 5.000000, "effect":[3,0], "transition":[0], "source":[0,0]} for producing media files to make the media data composed of a media file applied first effect within 1-2 seconds duration, a media file applied second effect within 3-4 seconds duration, and a media file applied third effect from 5 second. In some example, when playing the music, the script file is keeping being checked to be determined if there is any metadata to be read for the next duration. In some embodiments, the frame buffer used for storing trimmed videos/images is refreshed after rendering each frame of media data. The media data is not stored as a file in the memory. In other words, image frames of the media data are not actually composed to form a media file until users trigger an instruction to export all image frames of the media data.

Figure 2:
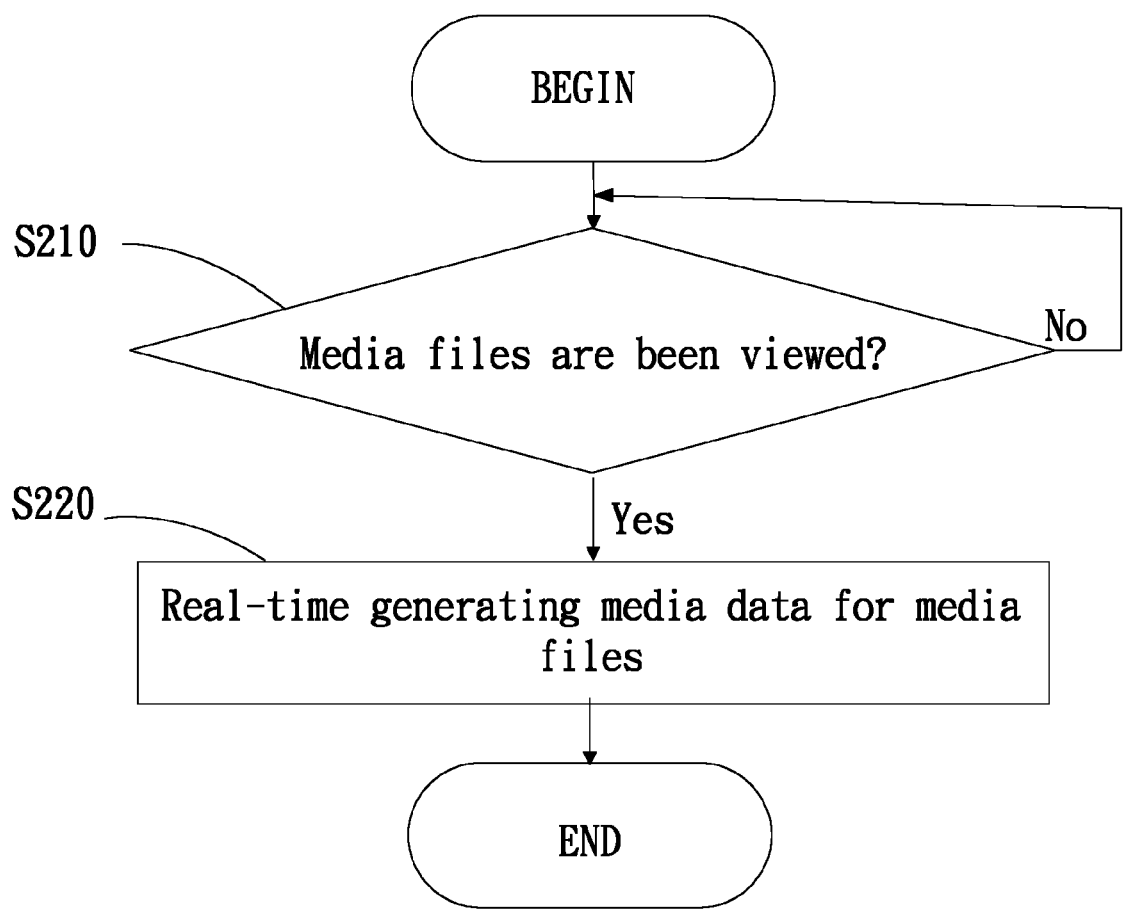
FIG. 2 is a flowchart of an embodiment of a method for media file management of the invention.

FIG. 2 is a flowchart of an embodiment of a method for media file management of the invention. The method for media file management can be used in an electronic device, such as a computer, or a portable device, such as a digital camera, a handheld device such as a mobile phone, a smart phone, a PDA, a GPS, or any picture-taking device. In the embodiment, media data is produced for media files.

In step S210, it is determined whether media files are been viewed. If the media files are not been viewed (No in step S210), the procedure remains at step S210. When the media files are been viewed (Yes in step S210), in step S220, media data is real-time generated for the media files. The generation of the media data is discussed later. It is understood that, in some embodiments, the generated media data or a representative of the media data can be displayed for browsing, and related display managements are discussed later.

Figure 3:
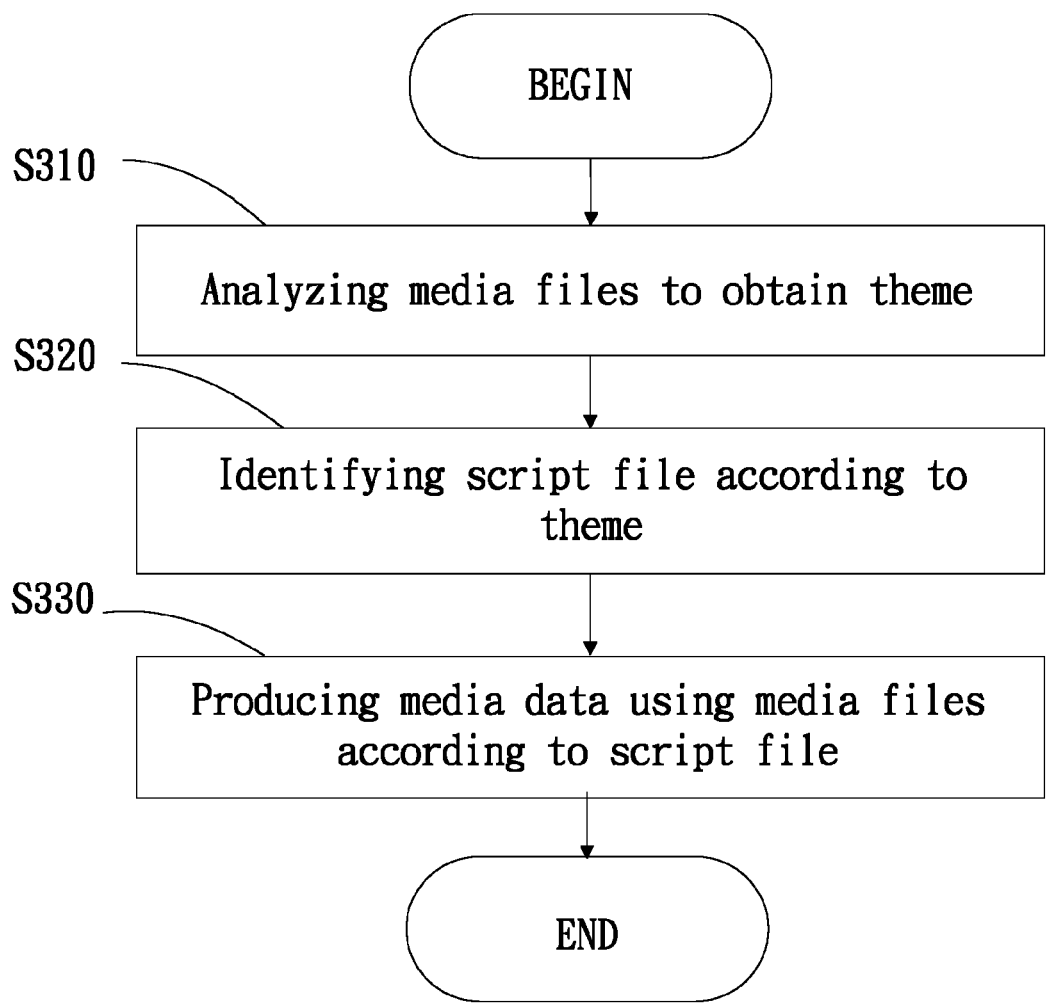
FIG. 3 is a flowchart of an embodiment of a method for generating media data of the invention.

FIG. 3 is a flowchart of an embodiment of a method for generating media data of the invention. In step S310, a plurality of media files are analyzed to obtain a theme. It is understood that, in some embodiments, the media files comprises images, videos, music, and/or texts. It is understood that, in some embodiments, an engine can simultaneously provide at least one video of n seconds and m images in n seconds. In an example, n=4 and m=20. It is noted that, the engine may be inside or outside the electronic device. It is understood that, in some embodiments, the theme can be a specific type or classification for the media files. For example, the theme may be Family related, Travel related, Party/Night out related, or others. It is noted that, the media files can be analyzed based on the content and/or the metadata of the media files. In an example, faces can be detected in the respective media files. The detected faces can be compared with photos in the phone book and social network tags. It can be known that if the analyzed media files are suitable for family or not. In another example, the position information, such as GPS location corresponding to the respective media files can be checked to determine whether the GPS location is far from user's usual stay or the position information can link to be a route. If so, it can be identified as a travel theme. In a further example, the exposure time of the respective media files can be checked to determine whether the respective media files are captured in a dark location, such as a pub. Similarly, the GPS location of the respective media files can be checked to know whether the location is a pub or a famous spot for people to get together. If so, it can be identified as a Party/Night out theme. Further, the taken date/time of the respective media file can be used as well for theme analysis. It is noted that, the above theme and analysis manners are only examples of the embodiments, and the present invention is not limited thereto. In step S320, a script file is identified according to the theme. It is understood that, in some embodiments, the script file defines characteristics, such as timing of playing videos/displaying images, applied effect/transition, and source type of media file according to tempos, melody, beats, cord, and/or chorus of the specific music. For example, the format of metadata may be {"timestamp":1.000000, "effect":[0,0], "transition":[0], "source":[0,0]}, wherein "timestamp" is the timing of playing media files composing the media data, "effect" and "transition" are the effects and transitions generated between the media files, and/or applied to the media files, "source" specifies which media file or proprietary format, like at least one video of n seconds and m images in n seconds. Then, in step S330, media data is produced using the media files according to the script file.

FIGS. 4-7 are flowcharts of further embodiments of the method for generating media data of the invention.

Figure 4:
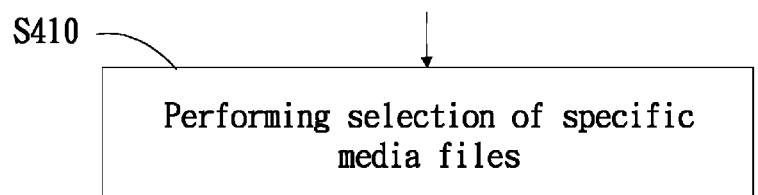
FIGS. 4-7 are flowcharts of further embodiments of the method for generating media data of the invention.

In FIG. 4, in step S410, specific media files are selected from the media files. It is understood that, in some embodiments, the selection can be performed based on contents of the respective media files, comments corresponding to the respective media files from at least one social network, position information corresponding to the respective media files, and/or historical behaviors, such as a view frequency, a share frequency, related data recorded when the respective media file is captured, and/or a zoom frequency corresponding to the respective media files. For example, the most frequently-watched/shared/zoomed items can be selected, the most commented photos/videos on a social network, such as FACEBOOK can be selected, all files in a group, which is grouped by time or location will be selected a candidates for a source of movie, the photos/videos which contain people information, such as face and smile for a certain theme, such as the family theme are selected, the photos with specific faces by face recognition linked to phone book's photos or social network tag, such as Facebook, which can be selected to create a family theme, the images which GPS location can link to a route are selected, the slow motion video for slow tempo music and vice versa are selected, and/or the contents by date and put into an order of dates can be selected. Further, blur photos and abnormal exposure photos are filtered. In some examples, the statistics data from recorder's sensors stored in the meta data of the media file can be checked to know the behavior of recorder when it is shooting. This statistics data can be used to extract/trim a meaningful video period, such as stable period video cut. Also, the taken date or time of the respective media file can be also used for selection. It is understood that, the selection rules can be various according to different requirements and applications. Above rules are only examples of the embodiment, and the present invention is not limited thereto. The selected media files can be used to produce the media data.

Figure 5:
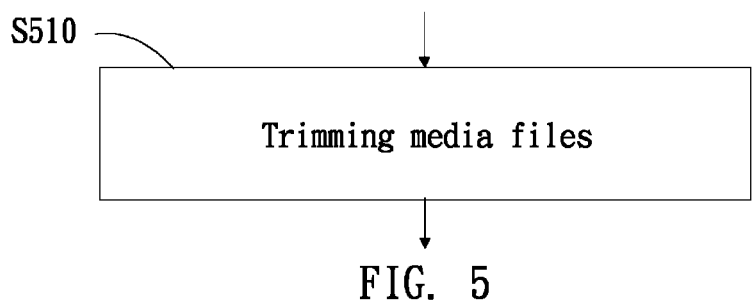
Figure 6:
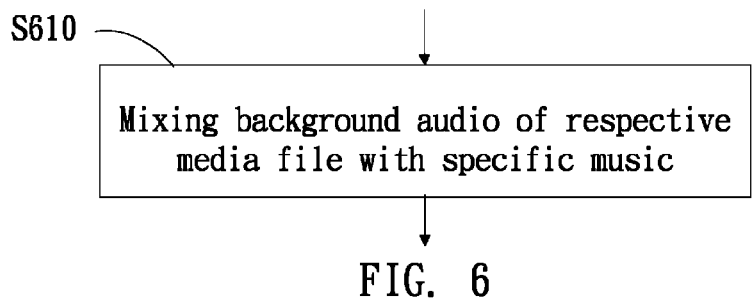
Figure 7:
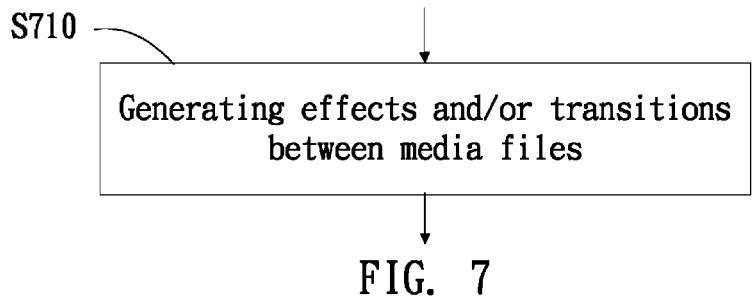

In FIG. 5, in step S510, the media files are trimmed to obtain the trimmed media files. In some embodiments, the periods that faces show up, at least one object is moving, and/or people is speaking are kept in the trimmed video. In some embodiments, the respective video is trimmed based on the script file, such that the trimmed video is aligned with the characteristics defined in the script file. Further, a blur video period will be filtered by checking the data stored in metadata. That data is statistics data obtained from sensors, like G-sensor Gyro when recording. Similarly, the trimming rules can be various according to different requirements and applications. Above rules are only examples of the embodiment, and the present invention is not limited thereto. The trimmed media files can be used to produce the media data. In FIG. 6, in step S610, a background audio of the respective media file is mixed with a specific music, wherein when a human speech exists in the video, the volume of the specific music within the corresponding specific period is lowered and mixed with the background audio of the media file. In FIG. 7, in step S710, effects, such as spot light, color effect, ken burns, and others and/or transitions, such as fade in/out, rotation, zoom in/out, and others are generated between the media files, and/or applied to the media files, wherein the effects and/or transitions are aligned with the script file, such that the effects and/or the transitions can occur at the right timing. It is noted that, in some embodiments, the content for the effect and/or transition is real-time generated when the media data is played.

Figure 8:
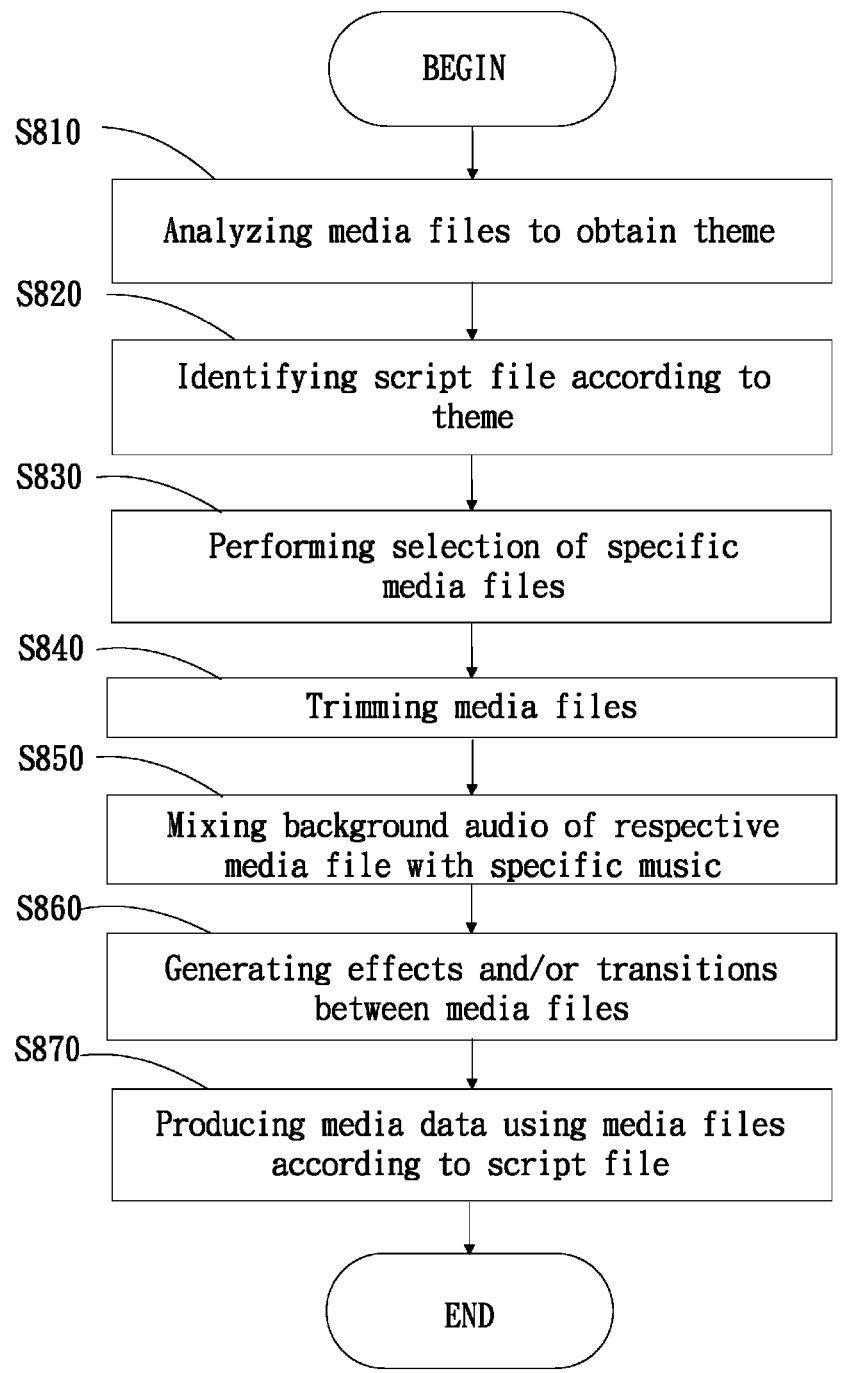
FIG. 8 is a flowchart of another embodiment of a method for generating media data of the invention.

FIG. 8 is a flowchart of another embodiment of a method for generating media data of the invention. In step S810, a plurality of media files are analyzed to obtain a theme. Similarly, in some embodiments, the media files comprises images, videos, music, and/or texts. In some embodiments, an engine can simultaneously provide at least one video of n seconds and m images in n seconds. In an example, n=4 and m=20. It is noted that, the engine may be inside or outside the electronic device. It is understood that, in some embodiments, the theme can be a specific type or classification for the media files. For example, the theme may be Family related, Travel related, Party/Night out related, or others. It is noted that, the media files can be analyzed based on the content and/or the metadata of the media files. In step S820, a script file is identified according to the theme. Similarly, in some embodiments, the script file defines characteristics, such as timing of playing videos/displaying images, applied effect/transition, and source type of media file according to tempos, melody, beats, cord, and/or chorus of the specific music. For example, the format of metadata may be {"timestamp":1.000000, "effect":[0,0], "transition":[0], "source":[0,0]}, wherein "timestamp" is the timing of playing media files composing the media data, "effect" and "transition" are the effects and transitions generated between the media files, and/or applied to the media files, "source" specifies which media file or proprietary format, like at least one video of n seconds and m images in n seconds. Then, in step S830, specific media files are selected from the media files based on contents of the respective media files, comments corresponding to the respective media files from at least one social network, position information corresponding to the respective media files, and/or historical behaviors, such as a view frequency, a share frequency, and/or a zoom frequency corresponding to the respective media files. In step S840, the media files are trimmed to obtain the trimmed media files comprising periods that faces show up, at least one object is moving, and/or people is speaking. It is understood that, in some embodiments, the respective video is trimmed based on the script file, such that the trimmed video is aligned with the characteristics defined in the script file. Similarly, the trimming rules can be various according to different requirements and applications. Above rules are only examples of the embodiment, and the present invention is not limited thereto. In step S850, a background audio of the respective media file is mixed with a specific music, wherein when a human speech is in a specific period of the video, the volume of the specific music within the corresponding specific period is lowered and mixed with the background audio of the media file. Then, in step S860, effects and/or transitions are generated between the media files, and/or applied to the media files, wherein the effects or transitions are aligned with the characteristics defined in the script file. In step S870, media data is produced using the media files according to the script file.

It is noted that, when the media files are been viewed, the media data is real-time generated for the media files. Additionally, a representative of the produced media data can be also displayed for users.

Figure 9:
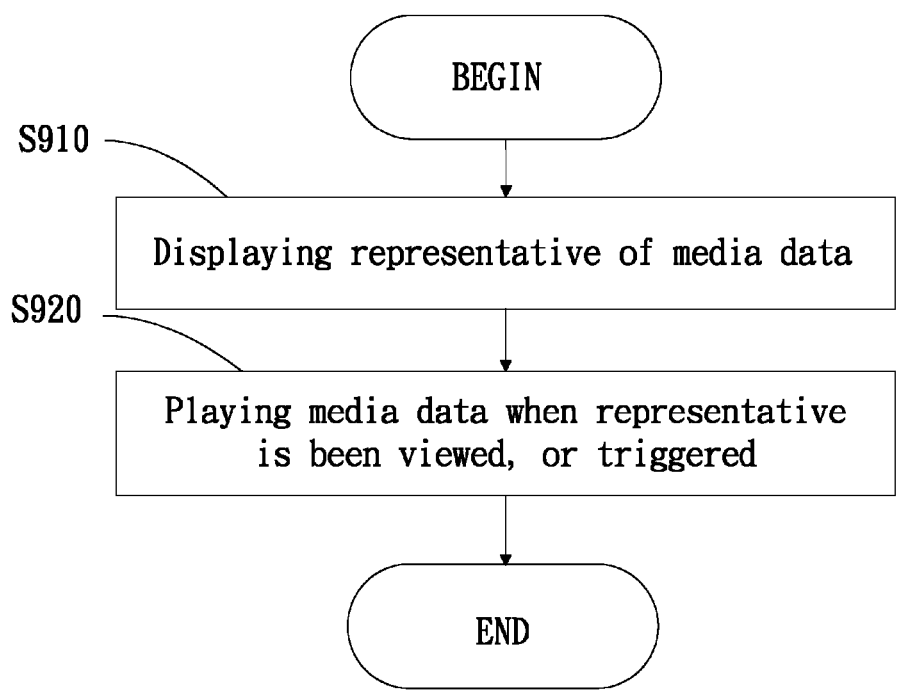
FIG. 9 is a flowchart of another embodiment of a method for media file management of the invention.

FIG. 9 is a flowchart of an embodiment of a method for media file management of the invention. The method for media file management can be used in an electronic device, such as a computer, or a portable device, such as a digital camera, a handheld device such as a mobile phone, a smart phone, a PDA, a GPS, or any picture-taking device. In the embodiment, a representative of media data is displayed.

In step S910, a representative of media data is displayed. It is understood that, in some embodiments, the representative may be displayed on a folder containing the media files. In step S920, the media data is played when the representative is been viewed, or when the representative is triggered, wherein the representative is triggered by pressing a play button shown on the representative.

Figure 10A:
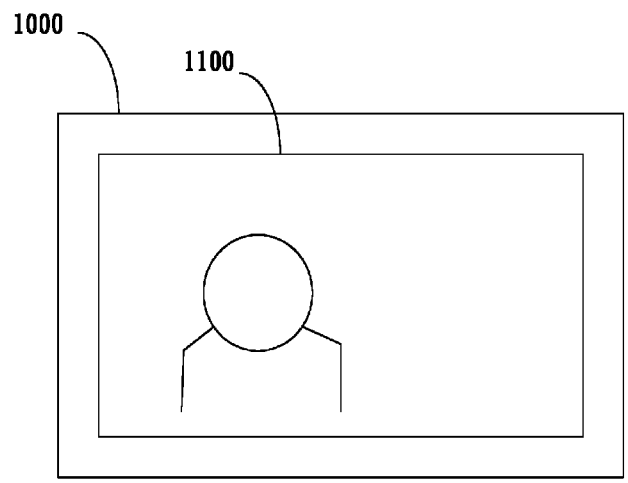
FIG. 10A is a schematic diagram illustrating an example of media data shown on a folder.
Figure 10B:
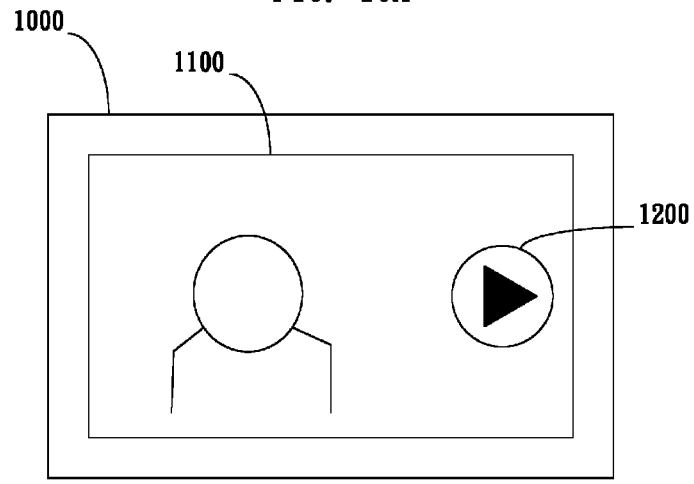
FIG. 10B is a schematic diagram illustrating an example of media data with a play button shown on a folder.

In an example, a folder 1000 may contain a plurality of media files, and a representative 1100 of the media data which is real-time produced when the media files are been viewed is displayed on the folder 1000, as shown in FIG. 10A. It is understood that, once the media files are been viewed in the file management system, media data can be produced through the process depicted in FIG. 3-8 for rendering. In an example, when the representative 1100 is been viewed, the media data is automatically played. In another example, a play button 1200 can be shown on the representative 1100, as shown in FIG. 10B. When the play button 1200 is pressed to trigger the representative 1100, the media data is played.

Figure 11:
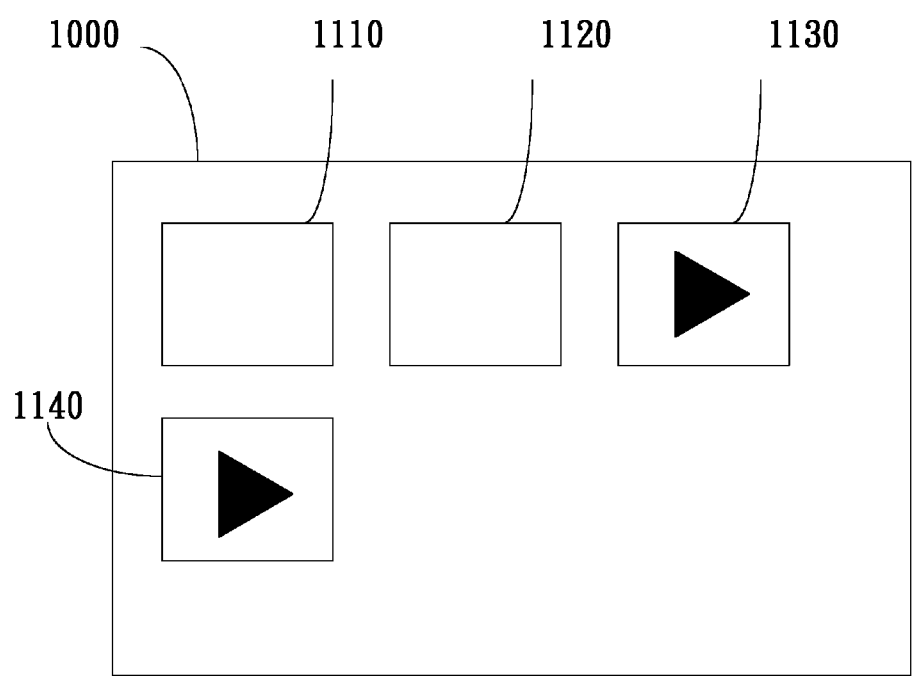
FIG. 11 is a schematic diagram illustrating an example of items in a folder.
Figure 12:
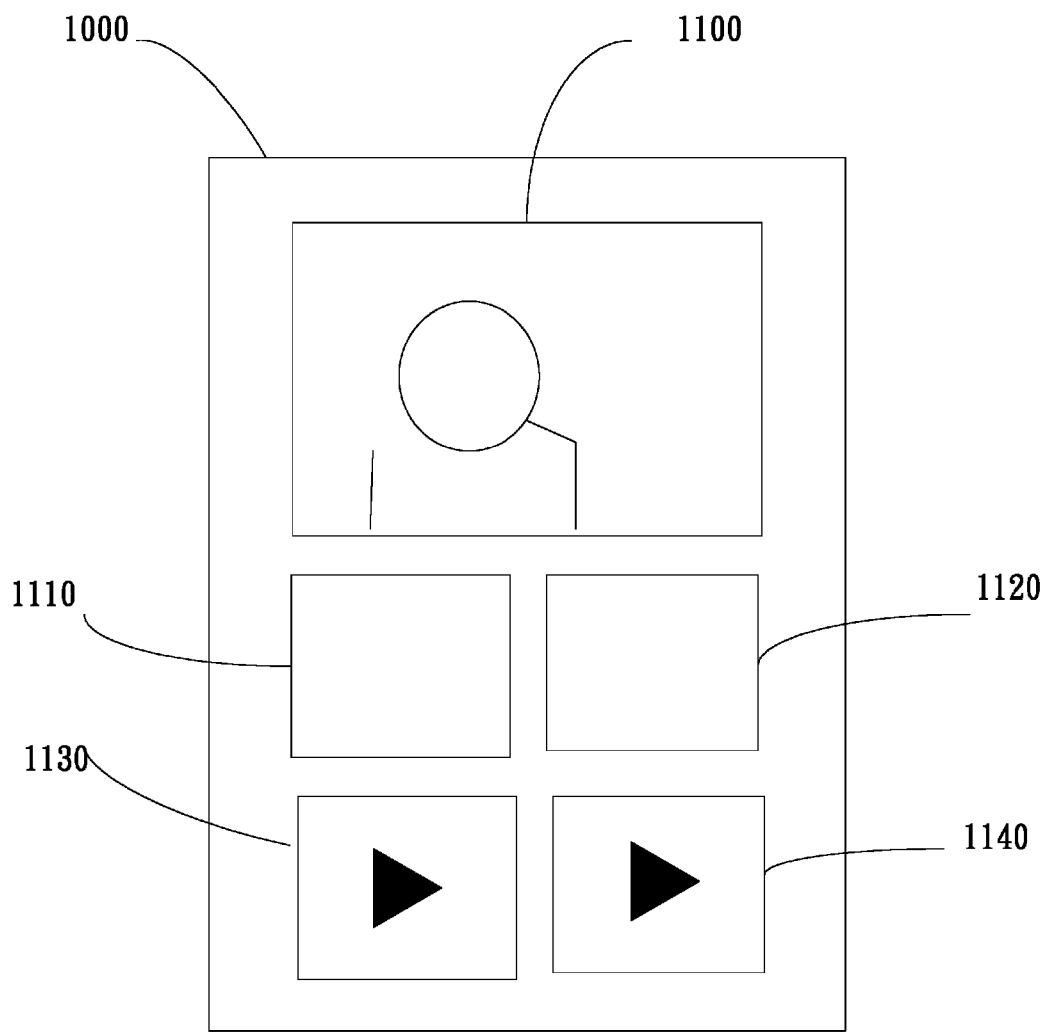
FIG. 12 is a schematic diagram illustrating another example of items in a folder.

After the folder is entered by tapping or double clicking the folder 1000, the media files within the folder 1000 can be viewed. For example, images 1110 and 1120, and videos 1130 and 1140 can be shown in the folder 1000, as shown in FIG. 11. It is understood that, in some embodiments, the media data is produced in real time, and the representative 1100 of the media data, the images 1110 and 1120, and the videos 1130 and 1140 can be shown in the folder 1000, as shown in FIG. 12.

Figure 13:
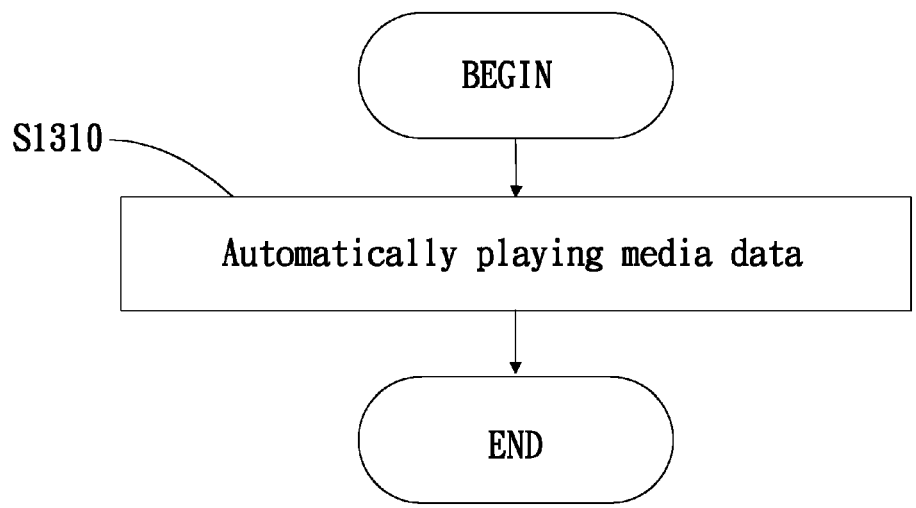
FIGS. 13 and 14 are flowcharts of further embodiments of the method for media file management of the invention.
Figure 14:
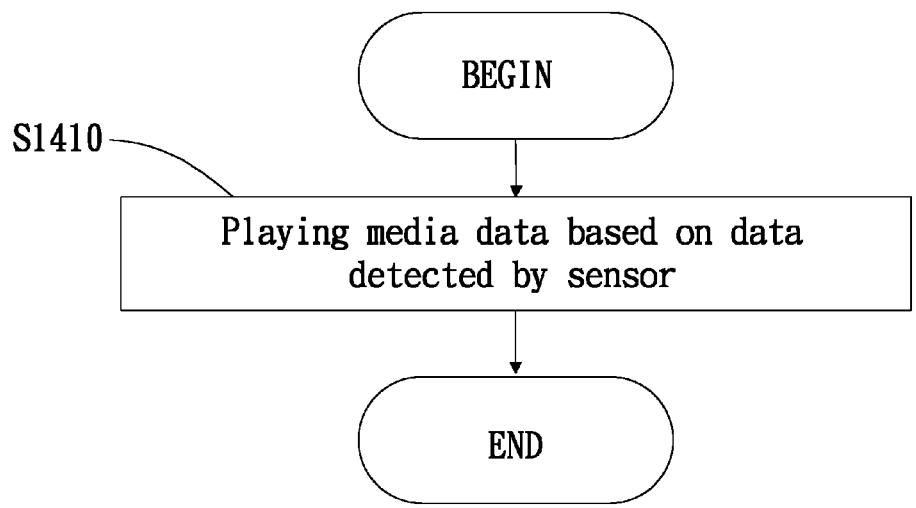

The play management of the media data is discussed as follows. FIG. 13 is a flowchart of a further embodiment of the method for media file management of the invention. When the folder is entered, in step S1310, the media data is automatically and played. It is noted that, in some embodiments, the media data is automatically and real-time produced when entering the folder. FIG. 14 is a flowchart of further another embodiment of the method for media file management of the invention. When the folder is entered, in step S1410, the media data is played based on data detected by a sensor, such as G sensor of the electronic device. For example, once a user rotates the electronic device from vertical to horizontal, and the sensor detected the change, the media data is triggered to play. Similarly, in some embodiments, the media data is automatically and real-time produced when entering the folder.

Figure 15:
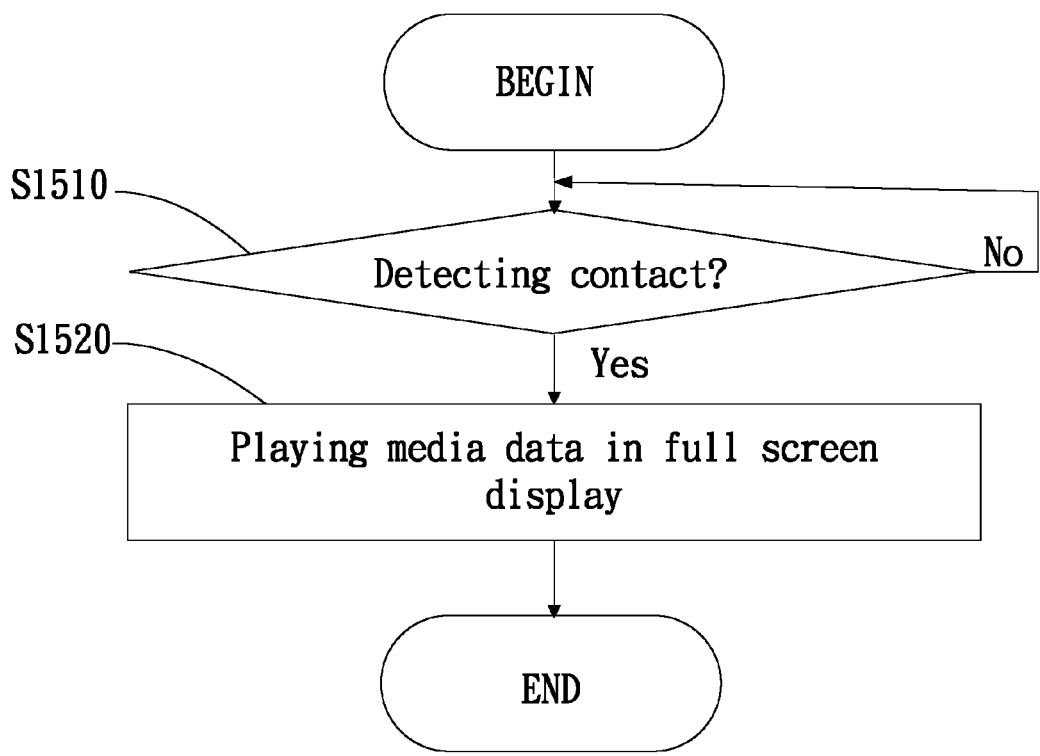
FIGS. 15 and 16 are flowcharts of embodiments of methods for media file management during the play of media data of the invention.
Figure 16:
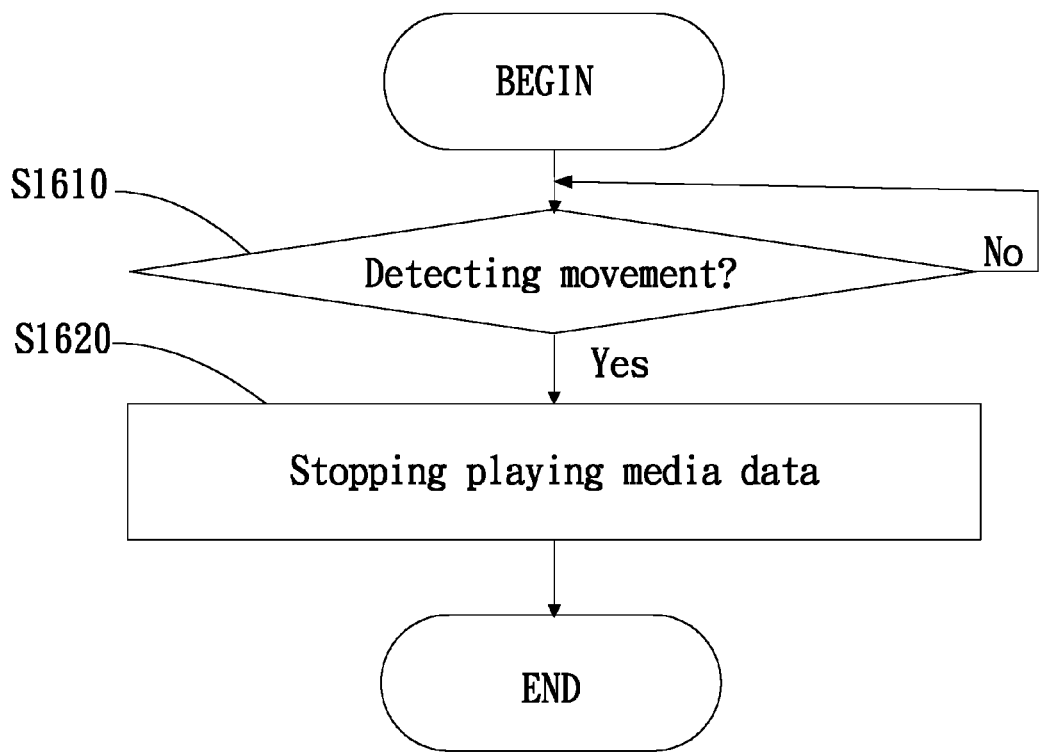

During the play of the media data, further play management of the media data is discussed. FIG. 15 is a flowchart of an embodiment of a method for media file management during the play of media data of the invention. In step S1510, it is determined whether a contact corresponding to the media data on a touch-sensitive device is detected. If no contact corresponding to the media data is detected (No in step S1510), the procedure remains at step S1510. If a contact corresponding to the media data on a touch-sensitive device is detected (Yes in step S1510), in step S1520, the media data is played in a full screen display. FIG. 16 is a flowchart of another embodiment of a method for media file management during the play of media data of the invention. In step S1610, it is determined whether a movement between the media files on a touch-sensitive device is detected. If no movement between the media files is detected (No in step S1610), the procedure remains at step S1610. If a movement between the media files is detected (Yes in step S1610), in step S1620, the play of the media data is stopped.

It is noted that, in some embodiments, a frame buffer used for storing the media data can be refreshed after each frame of the media data is rendered. That is, the real-time generated media data is removed after it was played. In some embodiments, the media data can be removed once the management/viewing of the media files is completed. However, in some embodiments, the media data can be also actually stored in the memory of the electronic device for further use.

Therefore, the methods and systems for media file management of the present invention can generate and/or present media data for a group of media files, such as images, videos, music, and/or texts, thereby assisting user to navigate the media files in the electronic device.

Methods for media file management, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for media file management for use in an electronic device, comprising:
    when a plurality of media files in the electronic device are viewed, real-time generating media data for the media files, wherein the generation of the media data comprises steps of:
    analyzing the media files to obtain a theme for the media files;
    checking exposure time and sharpness of the media files;
    identifying a script file according to the theme;
    selecting specific media files from the media files based on comments corresponding to the respective media files from at least one social network; and
    producing media data for the specific media files according to the script file.

2. The method of claim 1, wherein the step of analyzing the media files is performed by detecting faces in the respective media files, checking position information corresponding to the respective media files, or checking taken time or date, or sharpness of the respective media files.

3. The method of claim 1, further comprising selecting specific media files from the media files based on contents of the respective media files, position information corresponding to the respective media files, related data recorded when the respective media files are captured, or historical behaviors corresponding to the respective media files.

4. The method of claim 3, wherein the historical behaviors comprise a view frequency, a share frequency, or a zoom frequency.

5. The method of claim 1, further comprising trimming the media files to obtain the trimmed media files comprising periods that faces show up, at least one object is moving, or people is speaking 6. The method of claim 5, further comprising trimming the respective media file based on the script file, such that the trimmed video is aligned with characteristics defined in the script file.

7. The method of claim 6, wherein the characteristics defined in the script file is designed according to the tempos, melody, beats, cord, or chorus of a specific music.

8. The method of claim 7, further comprising mixing a background audio of the respective media file with the specific music, wherein when a human speech is in a specific period of the media file, the volume of the specific music within the corresponding specific period is lowered and mixed with the background audio of the media file.

9. The method of claim 1, further comprising generating effects or transitions between the media files based on the script file.

10. The method of claim 1, wherein the representative is displayed on a folder containing the media files.

11. The method of claim 1, wherein the media data is generated after entering a folder containing the media files.

12. The method of claim 11, further comprising automatically playing the media data once after entering the folder.

13. The method of claim 12, further comprising playing the media data in a full screen display if a contact corresponding to the media data on a touch-sensitive device is detected when the media data is played.

14. The method of claim 12, further comprising stopping playing the media data if a movement between the media files on a touch-sensitive device is detected.

15. The method of claim 11, further comprising playing the media data based on data detected by a sensor of the electronic device.

16. The method of claim 11, further comprising refreshing a frame buffer used for storing the media data after rendering each frame of the media data.

17. The method of claim 1, further comprising simultaneously providing at least one video of n seconds and m images in n seconds by an engine, such that the video and the images are analyzed.

18. The method of claim 1, wherein the media files comprises images, videos, music, or texts.

19. The method of claim 1, further comprising displaying a representative of the media data.

20. The method of claim 19, further comprising playing the media data when the representative is triggered, wherein the representative is triggered by pressing a play button shown on the representative.

21. The system of claim 20, wherein the processing unit further plays the media data when the representative is triggered, wherein the representative is triggered by pressing a play button shown on the representative.

22. The system of claim 20, wherein the processing unit further automatically plays the media data when the representative is being viewed.

23. The method of claim 19, further comprising automatically playing the media data when the representative is being viewed.

24. A system for media file management for use in an electronic device, comprising:
    a storage unit comprising a plurality of media files; and
    a processor, when a plurality of media files in the electronic device are viewed, real-time generating media data for the media files,
    wherein the generation of the media data comprises steps of:
    analyzing the media files to obtain a theme for the media files;
    checking exposure time and sharpness of the media files;
    identifying a script file according to the theme;
    selecting specific media files from the media files based on comments corresponding to the respective media files from at least one social network; and
    producing media data for the specific media files according to the script file.

25. The system of claim 24, wherein the step of analyzing the media files is performed by detecting faces in the respective media files, checking position information corresponding to the respective media files, or checking taken time or date, or sharpness of the respective media files.

26. The system of claim 24, wherein the generation of the media data further comprises a step of selecting specific media files from the media files based on contents of the respective media files, position information corresponding to the respective media files, related data recorded when the respective media files are captured, or historical behaviors corresponding to the respective media files.

27. The system of claim 26, wherein the historical behaviors comprise a view frequency, a share frequency, or a zoom frequency.

28. The system of claim 24, wherein the generation of the media data further comprises a step of trimming the media files to obtain the trimmed media files comprising periods that faces show up, at least one object is moving, or people is speaking.

29. The system of claim 28, wherein the generation of the media data further comprises a step of trimming the respective media file based on the script file, such that the trimmed video is aligned with characteristics defined in the script file.

30. The system of claim 29, wherein the characteristics defined in the script file is designed according to the tempos, melody, beats, cord, or chorus of a specific music.

31. The system of claim 30, wherein the generation of the media data further comprises a step of mixing a background audio of the respective media file with the specific music, wherein when a human speech is in a specific period of the media file, the volume of the specific music within the corresponding specific period is lowered and mixed with the background audio of the media file.

32. The system of claim 24, wherein the generation of the media data further comprises a step of generating effects or transitions between the media files based on the script file.

33. The system of claim 24, wherein the representative is displayed on a folder containing the media files.

34. The system of claim 24, wherein the media data is generated after entering a folder containing the media files.

35. The system of claim 34, wherein the processor further automatically plays the media data once after entering the folder.

36. The system of claim 35, wherein the processor further plays the media data in a full screen display if a contact corresponding to the media data on a touch-sensitive device is detected when the media data is played.

37. The system of claim 35, wherein the processor further stops playing the media data if a movement between the media files on a touch-sensitive device is detected.

38. The system of claim 34, wherein the processor further plays the media data based on data detected by a sensor of the electronic device.

39. The system of claim 34, wherein the processor further refreshes a frame buffer used for storing the media data after rendering each frame of the media data.

40. The system of claim 24, further comprising an engine, which simultaneously provides at least one video of n seconds and m images in n seconds, such that the video and the images are analyzed.

41. The system of claim 24, wherein the media files comprises images, videos, music, or texts.

42. The system of claim 24, wherein the processing unit further displays a representative of the media data.

43. A non-transitory machine-readable storage medium comprising a computer program, which, when executed, causes a device to perform a method for media file management, wherein the method comprises:

when a plurality of media files in the electronic device are viewed, real-time generating media data for the media files, wherein the generation of the media data comprises steps of:
   analyzing the media files to obtain a theme for the media files;
   checking exposure time and sharpness of the media files;
   identifying a script file according to the theme;
   selecting specific media files from the media files based on comments corresponding to the respective media files from at least one social network; and
   producing media data for the specific media files according to the script file.

* * * * *